United States Patent
O'Keeffe et al.

(10) Patent No.: US 7,480,300 B2
(45) Date of Patent: Jan. 20, 2009

(54) CONTENT ADDRESSABLE MEMORY ORGANIZED TO SHARE ENTRIES BETWEEN DIFFERENT ENTITIES SUCH AS PORTS OF A NETWORK UNIT

(75) Inventors: Daniel Martin O'Keeffe, Dublin (IE); Eugene O'Neill, Dublin (IE); Edele O'Malley, Dublin (IE); Eoin O'Brien, Dublin (IE)

(73) Assignee: 3Com Corporation, Marlborough, MA (US)

( * ) Notice: Subject to any disclaimer, the term of this patent is extended or adjusted under 35 U.S.C. 154(b) by 496 days.

(21) Appl. No.: 11/064,258

(22) Filed: Feb. 22, 2005

(65) Prior Publication Data
US 2006/0120373 A1    Jun. 8, 2006

(30) Foreign Application Priority Data
Dec. 2, 2004    (GB) .................................. 0426507.0

(51) Int. Cl.
*H04L 12/28*    (2006.01)
*G06F 7/04*    (2006.01)
(52) U.S. Cl. .......................................... 370/392; 726/3
(58) Field of Classification Search ....................... None
See application file for complete search history.

(56) References Cited

U.S. PATENT DOCUMENTS

| | | | | |
|---|---|---|---|---|
| 5,740,171 | A * | 4/1998 | Mazzola et al. | 370/392 |
| 6,377,577 | B1 * | 4/2002 | Bechtolsheim et al. | 370/392 |
| 6,510,509 | B1 * | 1/2003 | Chopra et al. | 712/13 |
| 6,697,276 | B1 * | 2/2004 | Pereira et al. | 365/49 |
| 6,778,530 | B1 * | 8/2004 | Greene | 370/389 |
| 6,922,410 | B1 * | 7/2005 | O'Connell | 370/401 |
| 7,227,862 | B2 * | 6/2007 | Kalkunte et al. | 370/389 |
| 2002/0085553 | A1 * | 7/2002 | Ku et al. | 370/389 |
| 2003/0108043 | A1 * | 6/2003 | Liao | 370/392 |
| 2003/0223423 | A1 * | 12/2003 | Yu et al. | 370/392 |
| 2003/0231631 | A1 * | 12/2003 | Pullela | 370/392 |

* cited by examiner

*Primary Examiner*—Edan Orgad
*Assistant Examiner*—Timothy J Weidner

(57) ABSTRACT

A content addressable memory stores entries each comprising a rule and as part of the entry a mask identifying all the entities to which the rule is applicable. A search pattern of data and a bit mask identifying the actual entity (or entities) associated with the data is applied as a search word along with a comparison mask that excludes all the other entities from the comparison of the search word with the entry. The CAM can thereby store efficiently in a single entry a rule that may be applicable to some but not all of a multiplicity of entities such as possible ingress ports of a network unit.

10 Claims, 5 Drawing Sheets

FIGURE 4

| CAM ||
|---|---|
| PORTID=1 | RULE#1 |
| PORTID=2 | RULE#1 |

FIGURE 5

| CAM ||
|---|---|
| PORTBITMASK#2 | RULE#2 |
| PORTBITMASK#1 | RULE#1 |

FIGURE 6

CAM Entry

| Port 2 | Port 1 | Port 0 | |
|---|---|---|---|
| CAM ||||
| 0 | 1 | 1 | Rule |
| | | | |

FIGURE 7

| | Port 2 | Port 1 | Port 0 | | | | | | | | | | |
|---|---|---|---|---|---|---|---|---|---|---|---|---|---|
| Search Mask | 0 | 0 | 1 | 1 | 1 | 1 | 1 | 1 | 1 | 1 | 1 | 1 | 1 |
| Search Pattern | 0 | 0 | 1 | Pattern Data |||||||||

| | | CAM | |
|---|---|---|---|
| ■■ | 1 | Rule ||
| ■■ | | | |

FIGURE 8

| | Port 2 | Port 1 | Port 0 | | | | | | | | | | |
|---|---|---|---|---|---|---|---|---|---|---|---|---|---|
| Search Mask | 1 | 0 | 0 | 1 | 1 | 1 | 1 | 1 | 1 | 1 | 1 | 1 | 1 |
| Search Pattern | 1 | 0 | 0 | Pattern Data |||||||||

| | | CAM | |
|---|---|---|---|
| | ■■ | | |
| 0 | ■■ | Rule ||
| | ■■ | | |

CONTENT ADDRESSABLE MEMORY ORGANIZED TO SHARE ENTRIES BETWEEN DIFFERENT ENTITIES SUCH AS PORTS OF A NETWORK UNIT

FIELD OF THE INVENTION

This invention relates to rules engines, particularly but not exclusively for use in packet-based communication networks, and particularly network units, such as hubs, switches and routers, that examine packets or selected portions thereof to determine whether a data pattern such as a selected portion of a packet conforms to a rule. The invention more particularly relates to the use of a content addressable memory (CAM) for the storage of such rules.

BACKGROUND TO THE INVENTION

In such network units as are mentioned above, it is convenient or desirable to subject a packet for examination for conformity with one or more 'rules'. Such an examination is distinct from an address lookup as is performed in switches or routers. Conformity with a rule requires that a relevant selection of portions of a packet match a prescribed set of values held in a rules store. Rules may be simple, in that they require that a particular flag, such as a header flag in a TCP (Transmission Control Protocol) segment have a particular binary value (e.g. the flag is to be set) but in general are rather more complex and require the matching of a large number of bit selected from the packet. One example of a more complex rule is an ACL (Access Control List) rule, which specifies a network source address, a network destination address, an application port number, a source port number and an identification of the protocol and may specify additional fields.

The finding of a match of a rule may have a variety of consequences. For example, they may be used to exert a security check and to prescribe the discard of a packet if the rule is fulfilled. They may prescribe the copying of a packet In switches and routers, where the packet is subjected to a lookup to obtain a forwarding data (usually in the form of a port bit mask) indicating from which port or ports a packet should be forwarded form the unit, the forwarding data is customarily subjected to 'post-processing' wherein the forwarding data may be modified as a result of the actions of various processing engines operating in parallel with the lookup engine. A post-processing engine collates the actions of the various processing engines to develop final forwarding data, often in the form of a final forwarding port bit mask, to a forwarding engine. In this context, a rules engine may develop an action which may override or be supplementary to the forwarding data and may be performed by the post-processing engine. However, this context is given by way of example and is not intended to limit the contexts in which the invention in its broadest scope may be employed.

Content Addressable Memories

Content addressable memories (CAMs) are very convenient for use as a rules engine, particularly for long rules, in a rapid manner. As is well known, a content addressable memory has words representing 'rules' stored in the data lines and if there is a match between the content of an input 'key' word and the content of a data line, the CAM produces a match-indicating signal that identifies that line. Such a signal may be used on its own or as a pointer to a location in an associated memory that store the action associated with the respective rule.

It is known to mask a CAM selectively, by providing along with the input word a masking word that identifies which 'columns' are to be excluded from the comparison between the input word and the stored words. This is equivalent to changing the bits that are to masked into 'don't care' bits, which in ordinary ternary CAMs do not affect the matching of the rest of the content of a word. One example of masking for use in a somewhat different context is described in published application US 2003/0028713 A1. That document describes the use of masking of the least significant bits of a network address in a lookup engine to discover the longest match of the most significant bits of a multiplicity of network addresses, and the subsequent removal of the mask to obtain an exact match.

The problem to which the invention is directed is the occupancy of excessive space in an expensive CAM (which has a high consumption of power) when a given rule is relevant to a multiplicity of ports of a network unit An example of such rules is Access Control Lists (ACLs). These rules may differ depending on the port on which the packet ingresses. However, there are cases where the same rule would be applied to packets that ingress on any of a multiplicity of ports. The traditional method of applying a rule to different ports would be to store the rule once for each port to which the rule must be applied. An identifier (such as a portID) would be prepended to each rule to signify that the rule is relevant to that particular port The disadvantage of this system is that rules that are applicable to multiple ports must be stored multiple times, thus using valuable CAM storage. In addition, maintenance of the rule requires accesses to multiple CAM locations, thus using valuable bandwidth.

Network units commonly have 24 or 48 ports; but may have more. Moreover they may be cascaded to form a network entity with a number of ports corresponding substantially to the aggregate of the ports of all the units in the cascade.

Although the above discussion relates to packets and ports, there are analogous problems posed by the application of a multiplicity of rules to a packet which may refer to a multiplicity of network entities such as other network units and it is desired to apply the rule in respect of some of the network entities and not others. One example is in the operation of a cascade or mesh system of network units which are managed as if they were a single unit It may be desirable to apply a rule if packets are received by any one of a sub-group of the units but not if the packets are received by other unit s not in the sub-group.

Furthermore if a rule relating to any data pattern might be applicable to a plurality of entities, such as different possible sources of the data pattern (which could be a set of values in a statistical counter), similar problems occur.

SUMMARY OF THE INVENTION

Important features of the invention in a practical form are the use of a bit mask, identifying those entities to which a rule is applicable, and prepending the bit mask to a segment defining a rule in the respective entry in the CAM. The bit mask contains one bit for each entity, and setting a bit implies the rule is applicable to the corresponding entity. This allows the rule to be stored once, instead of a multiplicity of times with the traditional method.

To search a CAM with this proposed system, the CAM must have a feature whereby a comparison mask is supplied with the search pattern and indicates which columns to enable and disable for matching. For instance, in a 150 bit wide CAM, the comparison mask would have to be 150 bits, each bit representing a column in the CAM. During a search, if the bit in the comparison mask is set, then the corresponding column is enabled for matching; if the bit is clear, then no matching will occur on the corresponding column.

In the usual performance of the invention, the stored rule and bit mask are compared respectively with the relevant data pattern and a search pattern which indicates at least one selected entity i.e. the entity or entities to which the rule is actually applicable. The comparison mask will allow comparison of all the bits of the rule with the data pattern but will exclude from the comparison all the other entities not selected by the search pattern.

By way of example, the rule may be applicable when a packet is received on any one of some (but not all) of the ports of a multiple-port network unit or by any unit of some but not all the units in a cascade of units managed as if they were a single unit The bit mask may therefore be a port bit mask or a unit-identifying bit mask as the case may be. The search mask may, in the case of a received packet, mask all the ports except a single ingress port or may mask all the units except the 'source' unit within the cascade system.

However, the invention is applicable in other circumstances. For example, the comparison mask may exclude part of the rule, if a partial match on the rule is desired. Further, if the rule is to be applied to a packet otherwise ready for forwarding from egress ports the comparison mask would be developed in accordance with a port bit pattern (usually termed port bit mask) indicating those ports from which the packet is to be forwarded, and would exclude from the comparison all the unselected egress ports.

Further features of the invention will become apparent from the following description by way of example with reference to the accompanying drawings.

BRIEF DESCRIPTION OF THE DRAWINGS

FIG. 4 illustrates schematically a known manner of organizing of a CAM as a rules engine.

FIG. 5 illustrates schematically one manner of organizing of a CAM as a rules engine according to the invention.

FIG. 6 illustrates a CAM organized according to the invention.

FIG. 7 illustrates the operation of a CAM in accordance with the invention.

FIG. 8 illustrates the operation of a CAM in accordance with the invention.

DETAILED DESCRIPTION

Figure 1:
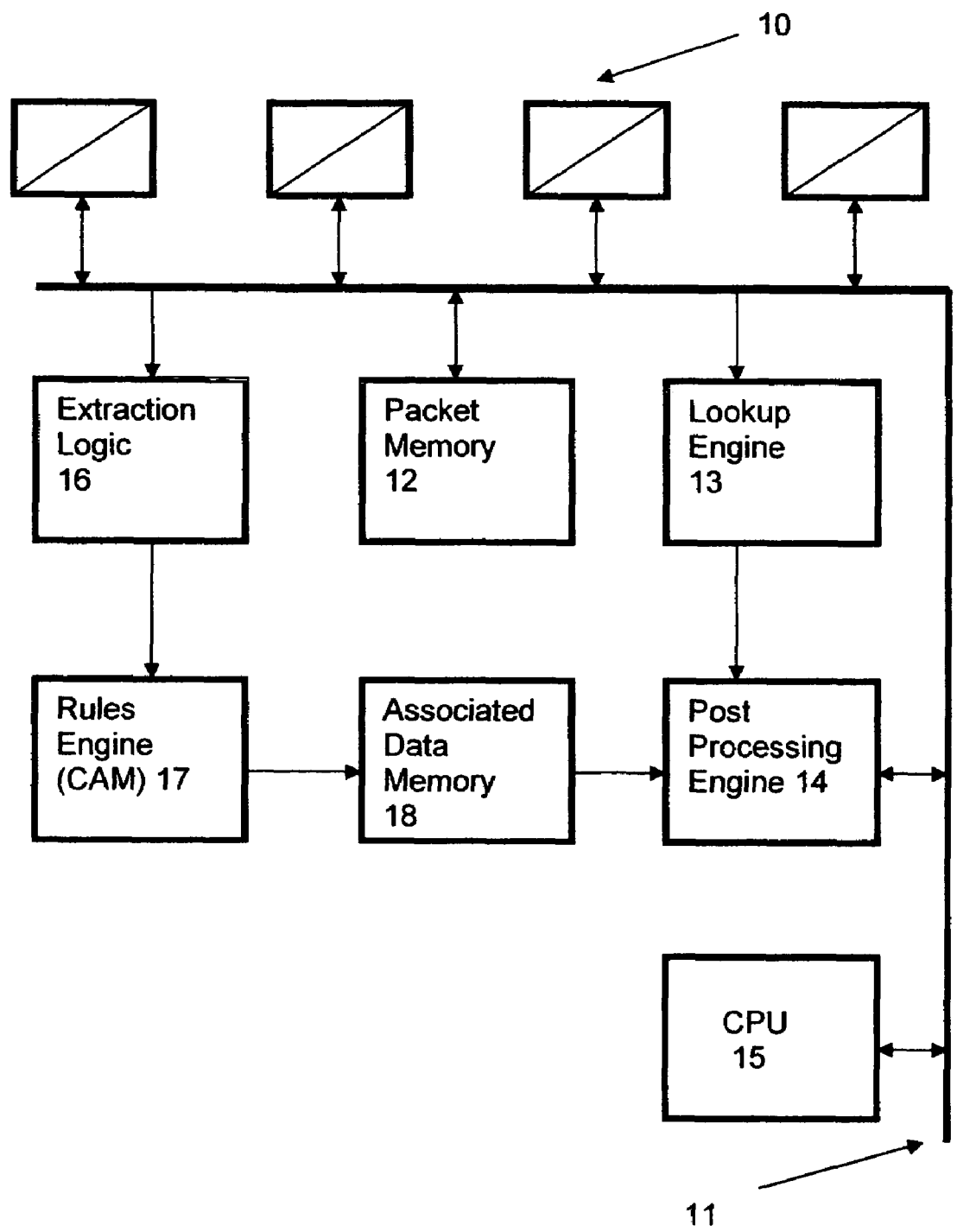
FIG. 1 is a simplified representation of a network switch.

FIG. 1 of the drawings shows schematically, for the sake of an exemplary context for the invention, a network unit in which the present invention may be embodied. Only the principal parts of the unit will be described because the invention is not dependent on any particular architecture.

The unit has a multiplicity of external ports 10 by which the unit can receive addressed data packets and from which addressed data packets can be forwarded. Only four are shown; there would usually be many more. The unit includes an internal communication system, herein simply represented by a bus 11, by which packets, control signals and commands are conveyed across the unit The unit includes a main memory 12 which receives packets while they are processed before being forwarded, or in some cases, discarded. When a packet is received, address fields in its header are examined by a lookup engine 13 which determines, with the aid of a lookup or forwarding database (not shown) forwarding data for the packet As is well known to those skilled in the art, forwarding data for the destination specified in the packet may not exist and therefore the unit may need to perform an address resolution protocol to obtain one. This and other customary features of a unit such as a switch or router will not be described.

The unit usually includes other processing engines (not shown) which, as indicated earlier may modify or supplement the forwarding data obtained by the lookup (LU) engine. The actions prescribed by the various engines are collated by a post-processing engine 15 which will (in the absence of any other consideration) produce a final forwarding action based on the forwarding data and in particular produce a 'final' bit mask so that the packet can be sent from the port or ports determined by the forwarding action.

The unit includes a central processor 15 which has a variety of tasks not directly relevant to the invention.

As thus far described the unit operates on known principles.

In FIG. 1 a rules engine 17 constituted by a CAM, is used to determine in conjunction with extraction logic 16, whether a selected portion (which need not be contiguous bits in the packet) conforms to a rule stored in the CAM. If a match on a rule is detected, the CAM may (in this example) provide a pointer to an associated data memory 18 (such as a RAM) to provide a command or other signal representing enactment of the rule. The action may (as shown) be supplied to the post-processing engine 14 for execution.

Before a specific example of the invention is described in detail, it is convenient to review the operation of a CAM.

Figure 2:
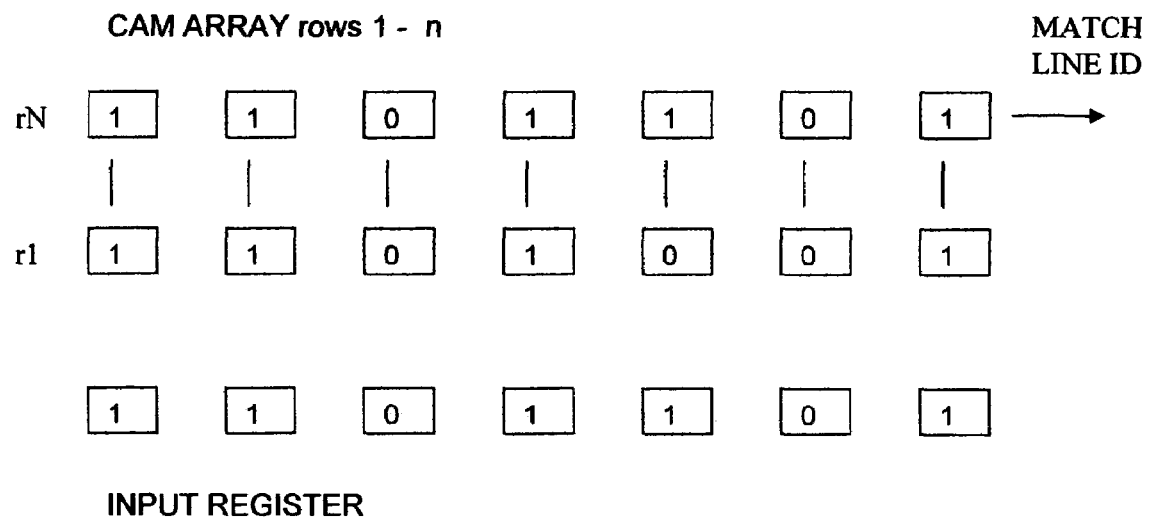
FIG. 2 illustrates schematically a known form of a CAM.

FIG. 2 illustrates in a simplified schematic form a CAM which has a multiplicity of data line r1 to rN, each composed of individual; cells each of which stores a bit of a data word. In the example, row r1 stores the word 1101001 and row rN stores 11011101. The ordinary operation of a CAM requires the application of an input word, shown as stored in an input register, to column lines. If the content of the input word matched the content of a stored word the CAM provides an output which identifies the particular row which yields the match. In the example, the input word is 1101101 and there is a match with the content of row rN. This is indicated by the arrow denoted 'MATCH LINE ID'.

In practice, a CAM is not only much larger than the one shown but more complex. For example it may be a ternary CAM, which allows cells to store a 'don't care'. Further, the CAM has additional complexity to cope with the possibility of a match on two or more lines. However, these are not directly relevant to the invention and will not be discussed further.

Figure 3:
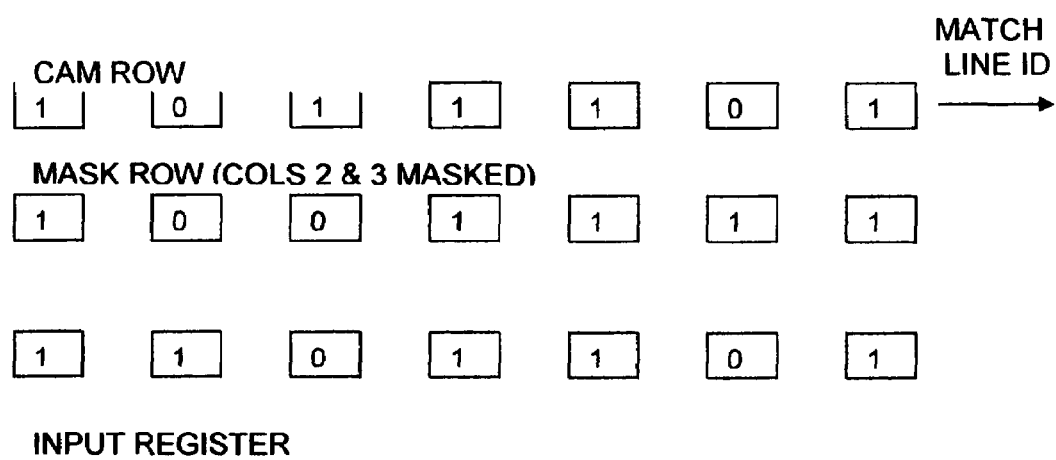
FIG. 3 illustrates schematically a known form of a CAM including a masking function.

FIG. 3 illustrates the effect of a comparison mask in a CAM. The top row in FIG. 3 is an ordinary CAM row which stores the word 1011101. The input word, in the input register, is 1101101. This does not match the stored word, since it differs in the $2^{nd}$ and $3^{rd}$ bits. FIG. 3 shows the effect of a comparison mask which (conventionally) has 1s to indicate the allowance of a comparison of a respective bit and an 0 to indicate the masking of the respective bit In the example, the bits in columns 2 and 3 (numbering from the left) are masked, i.e. excluded form the comparison. Thus since all the bits that are compared match, there is an output identification of a match.

FIG. 4 illustrates one manner of organizing the rules in a CAM. Each CAM entry comprises a rule (specified by a bit word) and an identification of a single port. The identification may be a coded representation of the port number, for example if there were 128 ports the port ID could be a seven-digit word. The rule is accessed by prepending an identification of the port (usually an ingress port) to the selected portion of the packet.

The inconvenience of a scheme as shown in FIG. 4 will be apparent when one considers (a) that there may be a large number of possible rules and (b) each of those rules may be applicable to a large multiplicity of (but not necessarily all) the ports in the unit or in the system served by the rules engine. Each port would require a separate entry in the CAM.

FIG. 5 illustrates the improvement according to the invention. Each rule is prepended by a port bit mask which identifies those ports to which the rule is applicable. For each port there is a respective bit which if set indicates that the rule is applicable to that port.

This in FIG. 5 a first rule #1 is applicable to the ports identified by the port bit mask #1 and a second rule is applicable to the ports identified by the port bit mask #2, and so on.

FIG. 6 illustrates a simple port bit mask and a rule together constituting one entry (i.e. data line)in the CAM. In this example there are thee ports, port 0, port 1 and port 2. The rule is applicable to ports 0 and 1 but not to port 2. The port bit mask has as many bits as there are ports on which a packet may be received and therefore consists in this example of three bits, i.e. 011 as shown.

In this example a rule may be applied, depending on the ingress port, to a received packet. In order to achieve proper matching of a rule, the port bit pattern has to be masked to allow only a comparison with the port on which the packet was received. It is convenient to apply a complete comparison mask which allows comparison with all the bits of the respective rule. Then the rule is rendered applicable only in respect of the ingress port for which the port bit is not masked.

One example is shown in FIG. 7, which illustrates the application of a search pattern and comparison mask to an entry as shown in FIG. 6 The row denoted 'search pattern' comprises the actual port bit pattern and the pattern defining the rule. The row denoted 'search mask' indicates those bit which will be excluded from the comparison by the CAM. All the bits of the rule are included in the comparison, so all the respective comparison mask bits are set to "1", but since the packet was received on port 0, the search pattern specifies only port 0 and likewise the search mask in respect of the ports excludes all the other ports, in this example ports 1 and 2, from the comparison. Therefore, the columns corresponding to ports 1 and 2 are disabled for matching (as shown by the shaded columns). As the bit in the port bit pattern corresponding to port 0 is set, then a match may occur provided that the pattern extracted from the packet conforms to the rule.

FIG. 8 shows the same rule and the port bit pattern but the example of a packet received on port 2. When a packet ingresses on this port, the search pattern bits and the search mask bits for all the other ports, i.e. ports 0 and 1, are cleared The search pattern bit and the search mask bit for port 2 is set, thus enabling matching on this column. However, as the bit for the ingress port (port 2) in the port bit pattern is not set, the rule does not apply to that port and so a match will not occur: the search pattern bit for port 2 is 1 and the port bit mask bit (shown in FIG. 6) for port 2 is 0.

Figure 9:
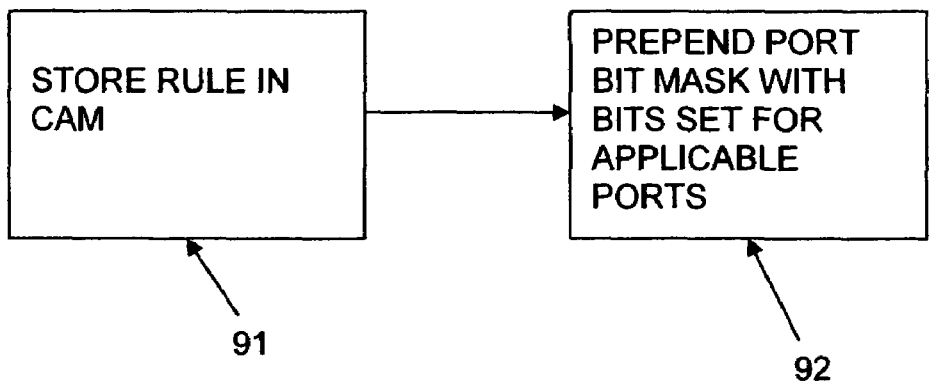
FIG. 9 illustrates a method of storing a rule in a CAM.

FIG. 9 summarizes the method of storing a rule in a CAM according to the invention. The rule is stored (stage 91) and is prepended (stage 92) with a port bit pattern identifying those ports to which the rule is applicable.

Figure 10:
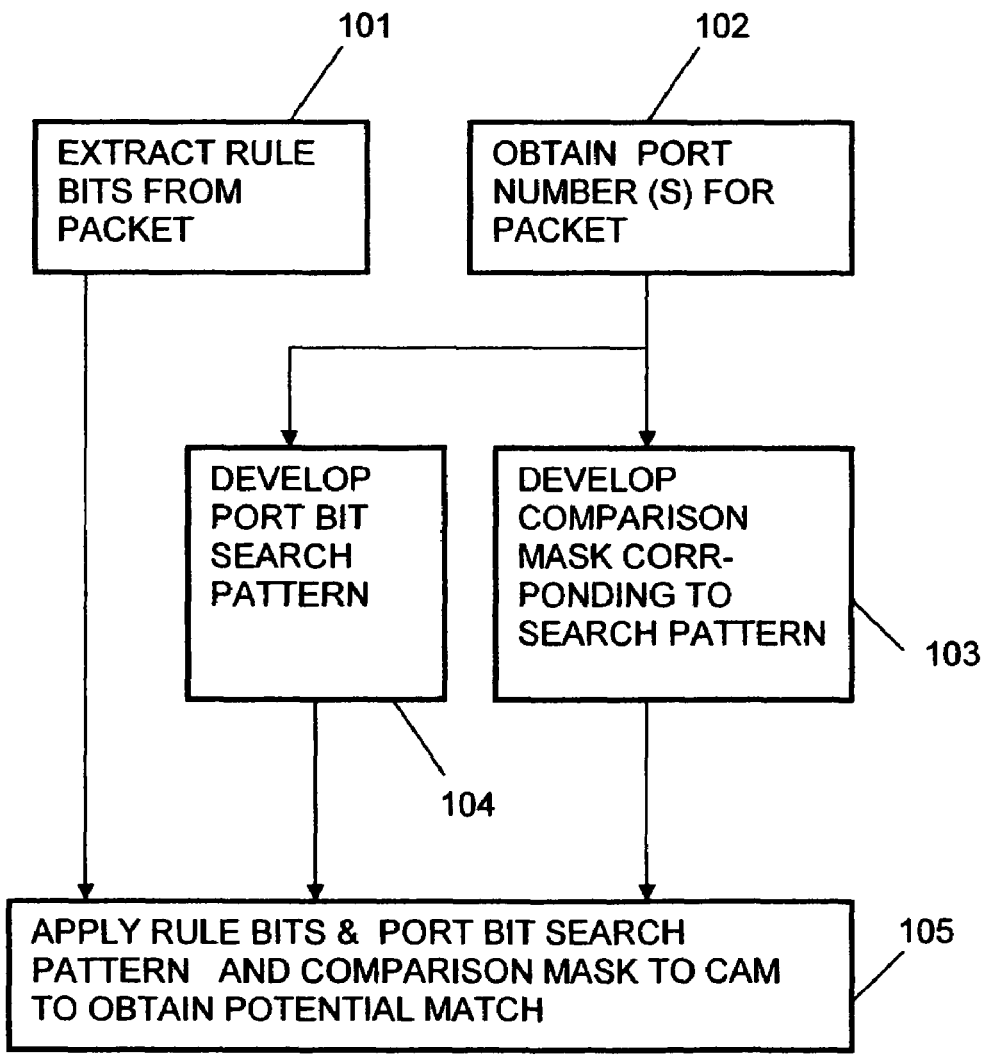
FIG. 10 illustrates a method of operating a CAM for rule matching.

FIG. 10 summarizes the method of rule matching using a CAM according to the invention. In stage 101, the relevant bits are extracted (by means of the extraction logic 16, FIG. 1); at the same time, the extraction logic obtains (stage 102) the ingress port number. From that it develops the search bit pattern (stage 103) and a corresponding comparison mask which excludes from the comparison all the ports except any port specified in the port search bit pattern (stage 104); in the case of an ingress packet, the search bit pattern and the comparison mask will exclude all but the particular ingress port, as described with reference to FIGS. 7 and 8. The packet pattern and the port bit search pattern as well as the comparison mask are applied to the CAM in stage 105. It should be remarked that the relevant selected portion of the packet may be compared simultaneously against a large number of rules, this being one benefit of using a CAM as a rules engine.

If the invention is to be applied to a multiplicity of units, e.g., the rule is applied if a packet entering a cascade system enters by way of one of a selected group of units but not by way of any other in the group, the portbitmask will be replaced by a unit-identifying mask; and the search pattern and therefore the comparison mask may identify the source unit, i.e. the unit by which the packet entered the cascade.

More generally, as indicated above, the bit mask which is stored as part of the content of a CAM entry can indicate to which of a group of entities a rule is applicable and the search mask and the comparison mask can exclude all but a particular entity to which the respective data that is applied as a search pattern to the CAM actually relates.

We claim:

1. A method of operating a content addressable memory in the examination of a selected portion of a packet for conformity with at least one rule, comprising:
   (a) storing the rule in a first segment of a data line of the content addressable memory;
   (b) storing in a second segment of said data line a port bit mask identifying to which network unit ports said one rule is applicable;
   (c) identifying at least one particular port; and
   (d1) applying to the content addressable memory a word which comprises said selected portion in respect of said first segment; and in respect of said second segment a search bit pattern that selects said at least one port and masks other ports; and
   (d2) applying to said content addressable memory a comparison mask which excludes all said other ports from a comparison of the word with the contents of the content addressable memory.

2. A method as in claim 1 wherein said search bit pattern specifies a single port and said comparison mask excludes all ports other than said single port from said comparison.

3. A method as in claim 1 wherein said selected portion of a packet comprises selected bits of a data packet.

4. A rules engine for the examination of a selected portion of a packet for conformity with at least one rule, the rules engine comprising:
   (a) a content addressable memory organized for storing the rule in a first segment of a data line of the content addressable memory and for storing a bit pattern in a second segment of said data line, said bit pattern specifying all network unit ports to which said rule is applicable; and
   logic organized:
   (i) to identify at least one particular entity port;
   (ii) to apply to the content addressable memory a word which comprises said selected portion in respect of said first segment; and in respect of said second segment a search bit pattern that selects said at least one port and masks other ports; and (iii) to apply to said content addressable memory a comparison mask which excludes all said other ports from a comparison of the word with the contents of the content addressable memory.

5. A rules engine as in claim 4 wherein said search bit pattern specifies a single port and said comparison mask excludes all ports other than said single port from said comparison.

6. A network unit comprising:

a multiplicity of ports for receiving and forwarding data packets; and a rules engine for the examination of a selected portion of a data packet in said network unit for conformity with at least one rule, the rules engine comprising:

a) a content addressable memory organized for storing the rule in a first segment of a data line of the content addressable memory and for storing a port bit mask in a second segment of said data line, said port bit mask specifying all the ports to which said rule is applicable; and logic responsive to said data packet and organized:

(i) to identify at least one particular port for the packet;

(ii) to apply to the content addressable memory a word which comprises said selected portion in respect of said first segment; and in respect of said second segment a search bit pattern that selects at least one port and masks other ports; and (iii) to apply to said content addressable memory a comparison mask which excludes all said other ports from a comparison of the word with the contents of the content addressable memory.

7. A rules engine for the examination of a selected portion of a data packet received by a network unit, which has a multiplicity of ports, for conformity with at least one rule, the rules engine comprising:

(a) a content addressable memory organized for storing the rule in a first segment of a data line of the content addressable memory and for storing a port bit pattern in a second segment of said data line, said port bit pattern specifying all the ports to which said rule is applicable; and logic responsive to a packet and organized:

(i) to identify at least one particular port for the packet;

(ii) to apply to the content addressable memory a word which comprises said selected portion in respect of said first segment; and in respect of said second segment a search bit pattern that selects at least one port and masks other ports; and (iii) to apply to said content addressable memory a comparison mask which excludes all said other ports from a comparison of the word with the contents of the content addressable memory.

8. A rules engine as in claim 7 wherein said search bit pattern specifies a single ingress port and said comparison mask excludes all ports other than said single ingress port from said comparison.

9. A network unit comprising:

a multiplicity of ports for receiving and forwarding data packets; and a rules engine for the examination of a selected portion of a data packet received by a said network unit for conformity with at least one rule, the rules engine comprising:

(a) a content addressable memory organized for storing the rule in a first segment of a data line of the content addressable memory and for storing a port bit mask in a second segment of said data line, said port bit mask specifying all the ports to which said rule is applicable; and logic responsive to a packet and organized:

(i) to identify at least one particular port for the packet;

(ii) to apply to the content addressable memory a word which comprises said selected portion in respect of said first segment; and in respect of said second segment a search bit pattern that selects at least one port and masks other ports; and (iii) to apply to said content addressable memory a comparison mask which excludes all said other ports from a comparison of the word with the contents of the content addressable memory.

10. A network unit as in claim 9 wherein said search bit pattern specifies a single ingress port and said comparison mask excludes all ports other than said single ingress port from said comparison.

* * * * *